United States Patent Office.

J. P. HUMES, OF WINNEBAGO CITY, MINNESOTA.

*Letters Patent No. 78,096, dated May 19, 1868.*

IMPROVED MEDICAL COMPOUND.

The Schedule referred to in these Letters Patent and making part of the same.

TO ALL WHOM IT MAY CONCERN:

Be it known that I, J. P. HUMES, of Winnebago City, in the county of Faribault, and State of Minnesota, have invented a new and improved Medical Compound; and I do hereby declare that the following is a full, clear, and exact description thereof, which will enable others skilled in the art to make and use the same.

This invention has for its object to furnish a safe and sure remedy for various lung-diseases; and it consists in forming a medicinal compound or composition of the substances, and in the manner hereinafter described.

In carrying out my invention, I use principally the stalk, leaves, and root of what is known as the resin-weed, the same being gathered in suitable seasons of the year, the former in August or September, and the root in the fall or spring of the year. The same is prepared in the first place by separate distillation.

I take the resin and liquid after distillation, and boil them together until a thin sirup is produced. I then put equal parts of the stalk and root-sirup together. When cold, I add one-sixth part as much of the alcoholic extract of the weed or root as there was of the sirup.

To this I add four pounds of loaf-sugar to each gallon so prepared.

This medicine cures asthma and all affections or diseases of the lungs, and is a sure remedy for heaves in horses.

Having thus described my invention, I claim as new, and desire to secure by Letters Patent—

The medicinal composition formed of the ingredients and in the manner substantially as herein described.

The above specification of my invention signed by me, this 15th day of October, 1867.

J. P. HUMES.

Witnesses:
 JOHN JAMES,
 D. P. WEIR.